United States Patent
Frazier et al.

(10) Patent No.: US 8,935,714 B2
(45) Date of Patent: Jan. 13, 2015

(54) INTERACTIVE USER-PREDICTION OF CONTENT

(75) Inventors: Kristopher Frazier, Frisco, TX (US); Ruchir Rodrigues, Dallas, TX (US); Lonnie Hiroshi Katai, Murphy, TX (US); Alison Kay Allen, Dallas, TX (US); Jayson D. Sellers, Flower Mound, TX (US); John Stanley Chittenden, Grapevine, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 228 days.

(21) Appl. No.: 12/981,821

(22) Filed: Dec. 30, 2010

(65) Prior Publication Data

US 2012/0174145 A1 Jul. 5, 2012

(51) Int. Cl.
*H04N 7/173* (2011.01)
*H04H 60/33* (2008.01)
*H04N 21/442* (2011.01)

(52) U.S. Cl.
CPC ......... *H04H 60/33* (2013.01); *H04N 21/44213* (2013.01); *H04H 2201/37* (2013.01)
USPC .................. 725/24; 725/13; 725/46

(58) Field of Classification Search
CPC ....... H04N 21/20; H04N 21/23; H04N 21/80; H04N 21/85; H04N 21/854; H04N 21/8545; H04N 21/25819; H04N 21/43; H04N 21/431; H04N 21/4312; H04N 21/442; H04N 21/44209
USPC ...................... 725/13, 24, 9, 39–61
See application file for complete search history.

(56) References Cited

U.S. PATENT DOCUMENTS

| | | | |
|---|---|---|---|
| 6,536,041 B1 * | 3/2003 | Knudson et al. ................. | 725/39 |
| 2007/0250846 A1 * | 10/2007 | Swix et al. ....................... | 725/10 |
| 2007/0294730 A1 * | 12/2007 | Feldstein et al. ................. | 725/68 |
| 2008/0229352 A1 * | 9/2008 | Pino et al. ........................ | 725/22 |
| 2009/0089838 A1 * | 4/2009 | Pino et al. ........................ | 725/40 |
| 2009/0312103 A1 * | 12/2009 | Chen ................................. | 463/41 |
| 2010/0333127 A1 * | 12/2010 | Scott et al. ....................... | 725/24 |
| 2011/0282947 A1 * | 11/2011 | Dodson .......................... | 709/206 |

* cited by examiner

Primary Examiner — Farzana Hossain (57) ABSTRACT

A method including providing at least one of a television service or an Internet access service to a customer; generating predictive options pertaining to content delivered to the customer, wherein the predictive options correspond to possible future events that could occur with respect to the content; receiving a customer selection of one of the predictive options; determining whether the customer-selected predictive option matches an outcome with respect to the content; and assigning a score to the customer based on whether the selected predictive option successfully or unsuccessfully predicted the outcome.

20 Claims, 12 Drawing Sheets

INTERACTIVE USER-PREDICTION OF CONTENT

BACKGROUND

According to recent surveys, U.S. consumers may view, on average, around four hours and forty-nine minutes of television each day. Additionally, content has now become readily available on the Internet to provide consumers with more opportunities to view various types of content.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "content," as used herein, is intended to be broadly interpreted to include, for example, visual data and audio data, and multi-media data. By way of example, content may include television content and Internet content. Television content may include local programming, national programming, free programming, and live-programming (e.g., a live broadcast, etc.), etc.). For example, television content may pertain to entertainment, politics, news, sports, television series, and/or other categories or genres of content. Internet content may include television content, user-created content, podcasts, and webcasts.

According to exemplary embodiments described herein, a content prediction system may permit users to predict the outcome of events pertaining to content. Based on the successes and failures of the users' predictions, users may be awarded scores (e.g., points) and/or other types of indicators (e.g., percentage of being correct, percentage of being incorrect, etc.) pertaining to the users' successes and/or failures. The users' scores and/or other indicators may be shared with other users or non-users.

According to exemplary an embodiment, the content prediction system may receive data and information from data collection sources (e.g., STATS, etc.). Additionally, or alternatively, the content prediction system may include a data mining engine to collect data and/or information. The content prediction system may perform interpretative data and informational analysis on the received data and information to generate predictive options. The content prediction system may present the predictive options to the users to allow the users to select which of the predictive options is going to occur. After the outcomes are known, the content prediction system may score and/or provide other indicators that correspond to the successes and/or failures of the users' predictions.

Figure 1A:
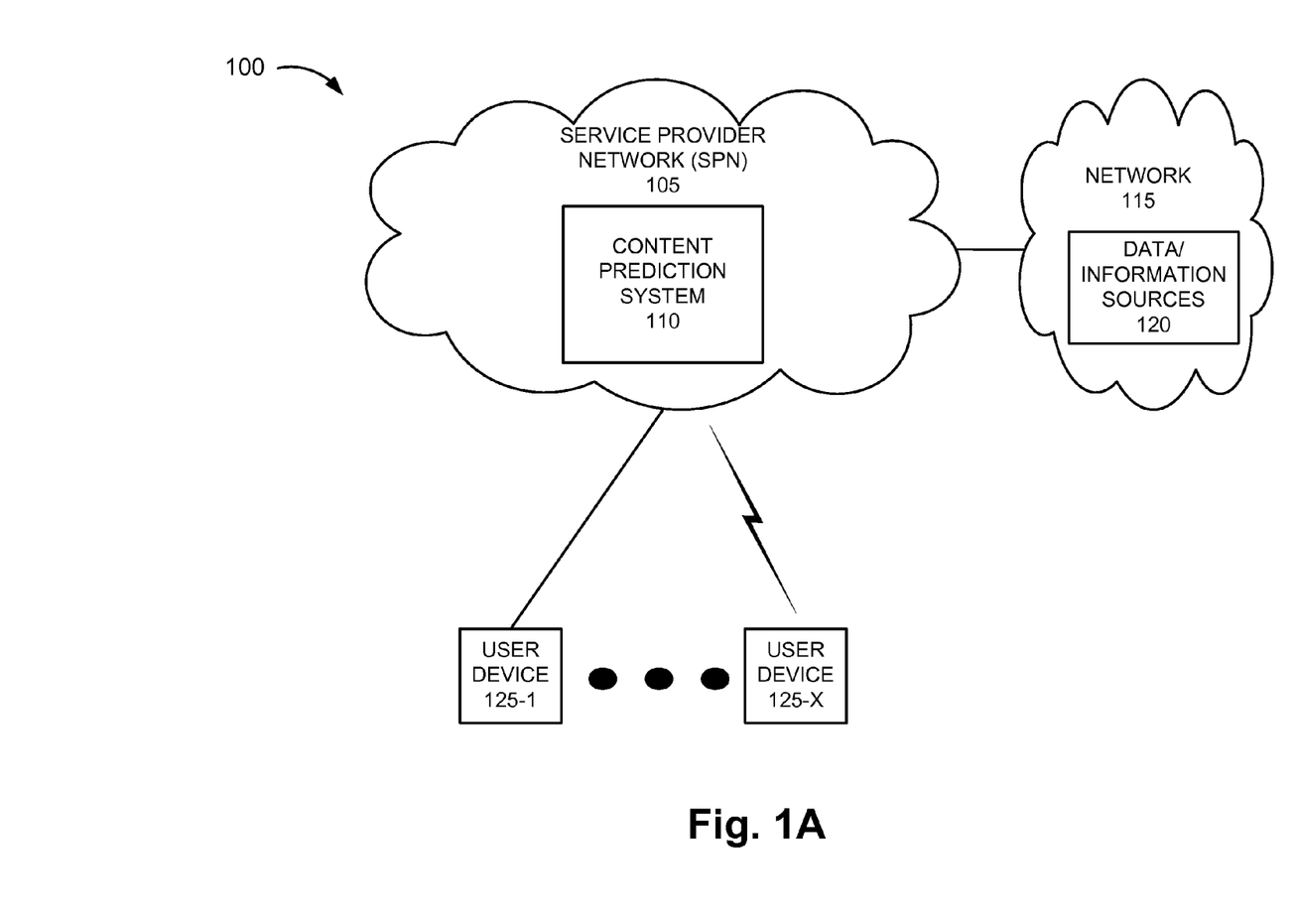
FIG. 1A is a diagram illustrating an exemplary environment in which an exemplary embodiment of a content prediction system may be implemented.

FIG. 1A is a diagram illustrating an exemplary environment 100 in which an exemplary embodiment of the content prediction system may be implemented. As illustrated in FIG. 1A, environment 100 may include a service provider network (SPN) 105 that includes a content prediction system 110, a network 115 that includes data/information sources 120, and user devices 125-1 through 125-X (referred to generally as user device 125 or user devices 125).

The number of devices and networks, and the configuration in environment 100 is exemplary and provided for simplicity. In practice, according to other embodiments, environment 100 may include additional devices, fewer devices, different devices, and/or differently arranged devices, than those illustrated in FIG. 1A. Additionally, or alternatively, in practice, environment 100 may include additional networks, fewer networks, and/or differently arranged networks, than those illustrated in FIG. 1A. Also, according to other embodiments, one or more functions and/or processes described as being performed by a particular device or component may be performed by a different device or component, or some combination of devices or components. Additionally, or alternatively, according to other embodiments, one or more functions and/or processes described as being performed by multiple devices or multiple components may be performed by different devices or components, or a single device or component, etc. Environment 100 may include wired and/or wireless connections among the devices illustrated.

SPN 105 may include a network that distributes or makes available services, such as, for example, television service, and/or Internet service. SPN 105 may correspond to a satellite-based network and/or a terrestrial-based network. According to an exemplary embodiment, SPN 105 may include a content prediction system 110. Although not illustrated, SPN 105 may include, for example, content distribution devices, content storage devices, application servers, billing devices, security devices, and/or other devices pertaining to the distribution or making available of services.

Content prediction system 110 may include one or multiple network devices that provide content predictive services to users. For example, content prediction system 110 may be implemented using server(s), computing device(s), data and/or informational collection system(s), data and/or informational repository system(s), data and/or informational analytic system(s), predictive option generator(s), predictive outcome analytic system(s), and/or other types of devices, components, etc. Content prediction system 110 will be described further below.

Network 115 may include one or multiple networks of various types. By way of example, network 115 may include a wide area network (WAN), the Internet, an intranet, a data network, a wireless network, and/or a wired network. Network 115 may include data/information sources 120.

Data/information sources 120 may include devices that distribute data and information pertaining to various categories of content. For example, STATS distributes sports data and information. Data/information sources 120 may also include data and/or information sources that may be datamined. For example, data/information sources 120 may include publically available data and/or information (e.g., web sites, Internet sites, etc.) and/or other types of data/information sources that may be accessed (e.g., based on monetary fees, business partnerships, etc.). Data/information sources 120 may also include content sources, such as, television content providers, Internet content providers, and/or other types of content providers.

User device 125 may include one or multiples devices that allow users to receive services, such as, for example, television service and Internet service. For example, user device 125 may include a television, a combination of a television and an SPN television interface device (e.g., a client, a thin client, a set-top box, a converter box, a receiver, a server, a peer device, a tuner, and/or a digibox), a computer (e.g., a desktop computer, a laptop computer, a palmtop computer, a netbook computer, etc.), a combination of a computer or a television and an SPN Internet interface device (e.g., a modem, a wireless router, a wired router, a gateway, etc.), a mobile or a portable communication device (e.g., a tablet device, an Internet access device, a personal digital assistant (PDA), etc.), a combination of a gaming device and a display, and/or some other type of suitable device(s). According to an exemplary embodiment, user device 125 may include an application (e.g., a client application, a peer application, a widget, a plug-in to an Internet browser, etc.) to permit users to interact with content prediction system 110.

Figure 1B:
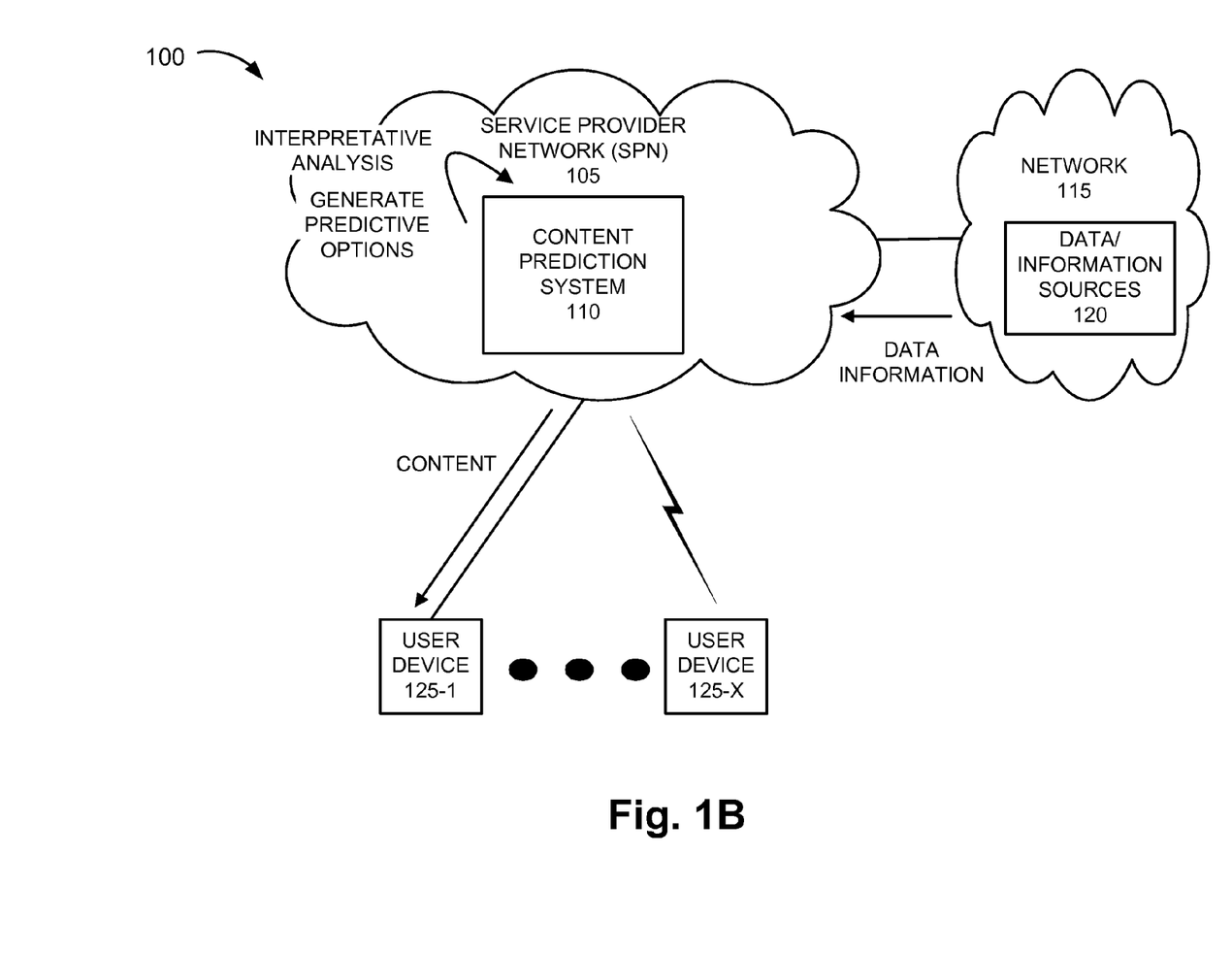
FIGS. 1B-1G are diagrams illustrating an exemplary process associated with an exemplary embodiment of a content prediction system.

FIGS. 1B-1G are diagrams illustrating an exemplary process associated with an exemplary embodiment of content prediction system 110. In this example, it may be assumed that a user (not illustrated) is viewing content (e.g., a baseball game), provided by SPN 105, via user device 125-1. Referring to FIG. 1B, as the content is being delivered to user device 125-1, content prediction system 110 receives data and/or information from data/information sources 120 of network 115. For example, the data and/or information include(s) real-time or near real-time data and/or information pertaining to the baseball game viewed by the user.

As further illustrated in FIG. 1B, content prediction system 110 applies interpretative analytics to the received data and/or information. For example, content prediction system 110 may identify a particular player that is batting, the count (e.g., the number of balls, the number of strikes), the number of outs, men on base, the score, the inning, and other information pertaining to the teams (e.g., players, their positions, etc.) and the current status of the baseball game. Based on the applied interpretive analytics, content prediction system 110 may generate predictive options. For example, the predictive options may correspond to possible events that may occur given the current state of the game, as interpreted by content prediction system 110.

According to an exemplary embodiment, content prediction system 110 may generate one or multiple sets of predictive options having different time granularities. As an example, content prediction system 110 may generate a set of predictive options having one time granularity, such as, (1) team A scores this inning; (2) team A does not score this inning, and another set of predictive options having another time granularity, such as, (1) team A wins the game; (2) team B wins the game. According to an exemplary embodiment, the time granularity pertaining to a set of predictive options may be a configurable parameter by the user and/or by the SP associated with content prediction system 110.

Additionally, according to an exemplary embodiment, content prediction system 110 may generate one or multiple sets of predictive options having different levels of specificity. For example, one set of predictive options may have a finer level of specificity, such as, (1) the next pitch the player hits the ball; (2) the next pitch the player swings and misses, (3) the next pitch the player does not swing and it is called a ball; and (4) the next pitch the player does not swing and it is called a strike, relative to another set of predictive options, which may have a coarser level of specificity, such as (1) the player gets a hit; (2) the player does not get a hit; (3) the player gets a hit and drives home a run; and (4) the player gets a hit and does not drive home a run. According to an exemplary embodiment, the level of specificity pertaining to the predictive options may be a configurable parameter by the user and/or by the SP associated with content prediction system 110.

Figure 1C:
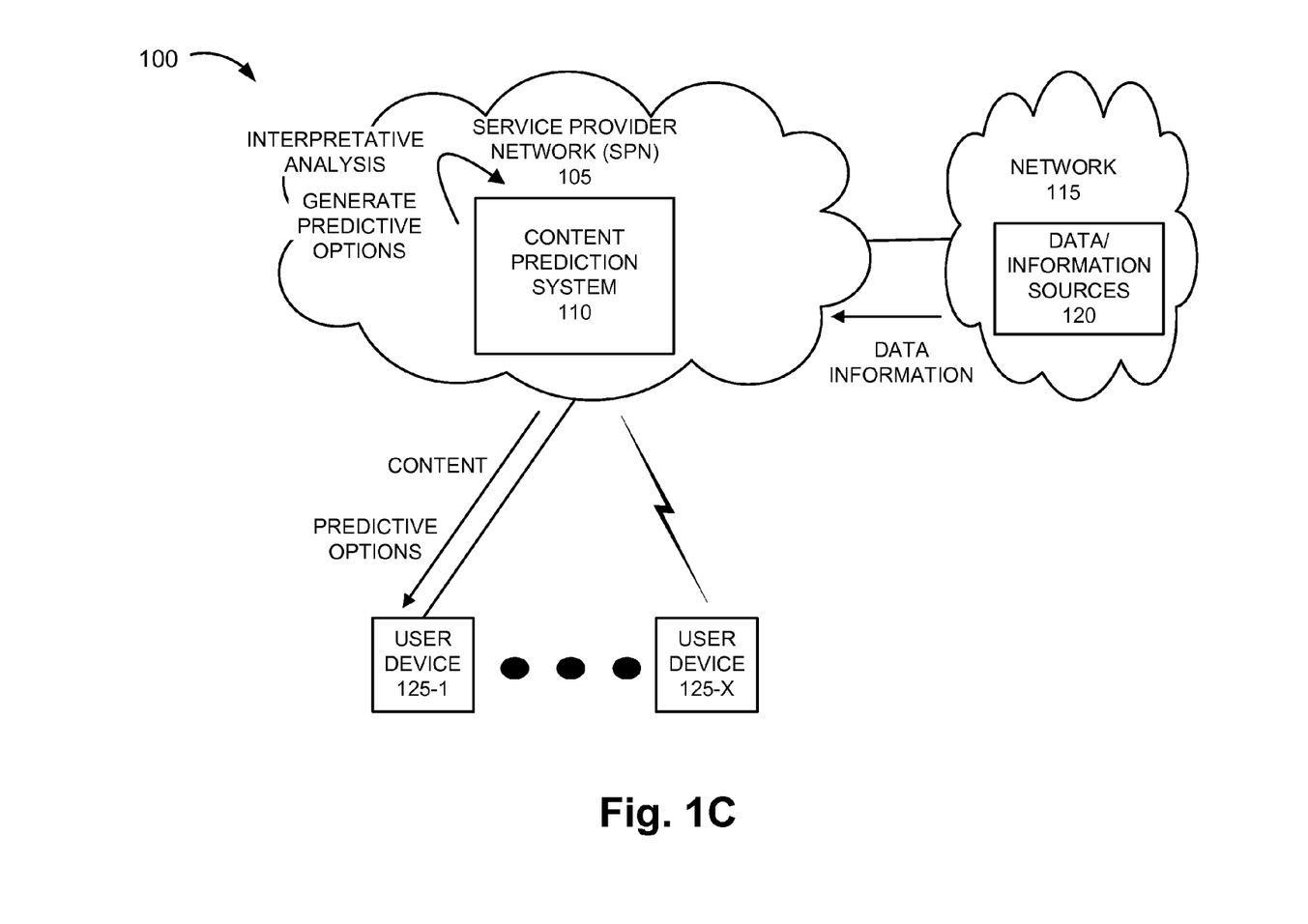

Referring to FIG. 1C, when the predictive options are generated, they may be presented to the user. For example, an interactive, graphical user interface may be displayed with the content to permit the user to select one of the predictive options. For example, the graphical user interface may correspond to an overlay, an interactive bug, a border frame, or some other type of graphical user interface. Depending on the time granularity of the predictive options and the current time position in the baseball game (e.g., first inning versus ninth inning, etc.), content prediction system 110 may provide the predictive options to the user at different times. For example, content prediction system 110 may send predictive options (1) team A wins the game; (2) team B wins the game, at the beginning of the first inning, at the bottom of the fourth, at the top of the ninth inning, etc. Alternatively, for example, when the predictive options pertain to whether an at-bat player will hit a home run, hit a single, strike out, etc., the predictive options may present the predictive options to the user when the player steps-up to the plate. In this regard, the time at which a set of predictive options may be presented to the user may be different between predictive options, and the time window at which the user has an opportunity to select a predictive option may be different between predictive options. A set of predictive options may include one or multiple predictive options.

Figure 1D:
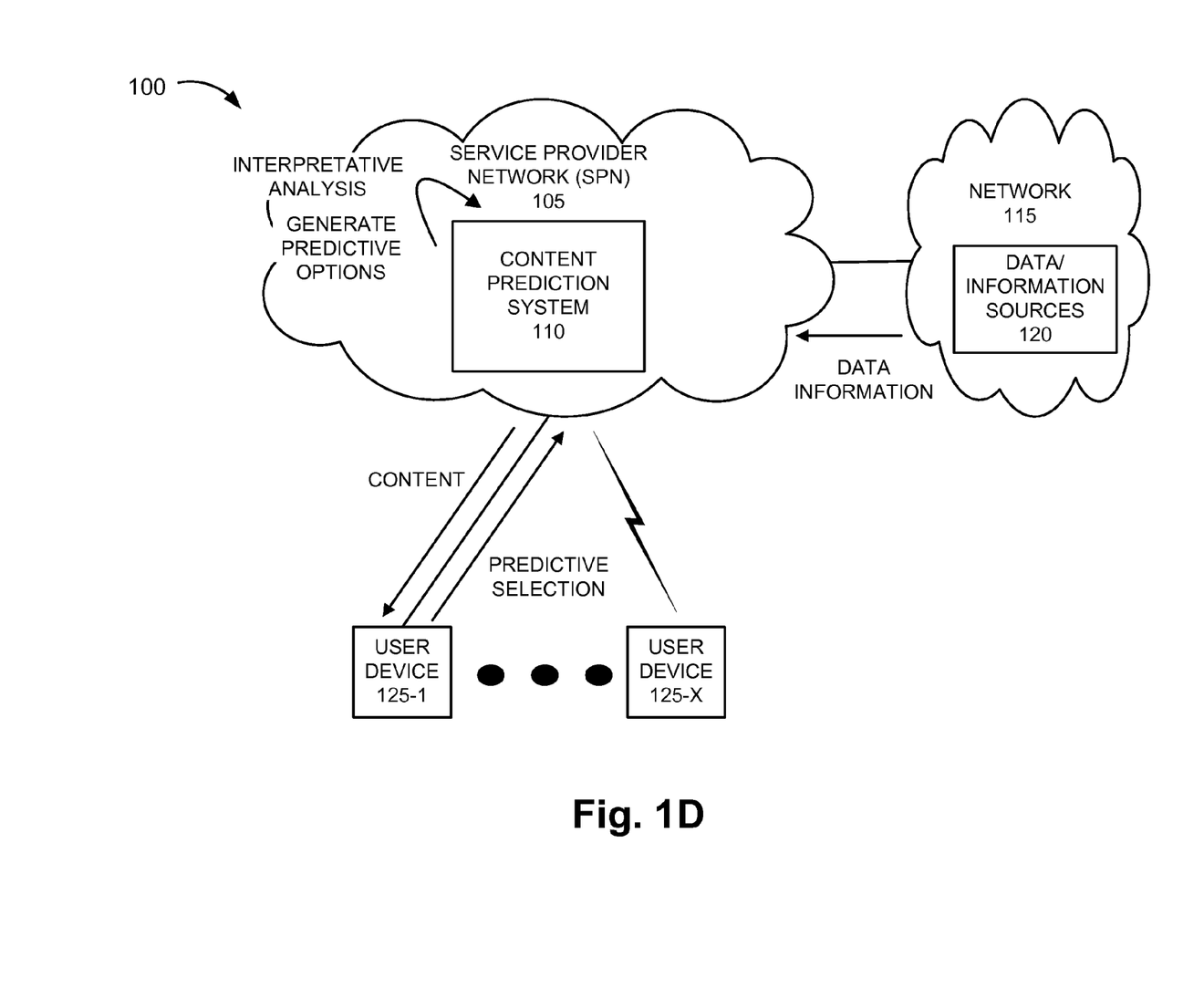

As illustrated in FIG. 1D, it may be assumed that the user selects a predictive option. In this example, the set of predictive options may include (1) the player gets a hit; (2) the player does not get a hit; (3) the player gets a hit and drives home a run; and (4) the player gets a hit and does not drive home a run. The user selects predictive option (1) and his/her prediction selection is sent from user device 125-1 to content prediction selection 110.

Figure 1E:
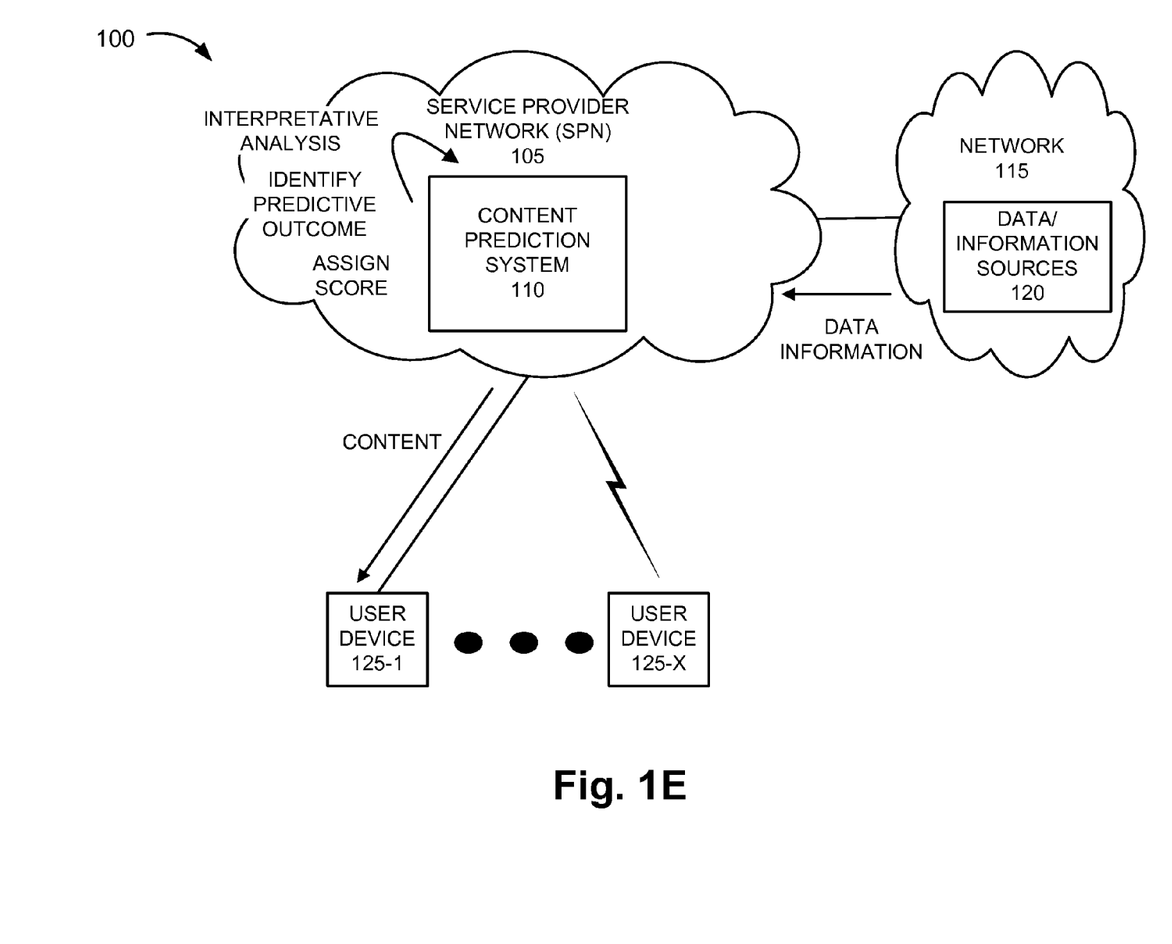

Referring to FIG. 1E, content prediction system 110 may continue to receive real-time or near real-time data and/or information pertaining to the baseball game viewed by the user. Content prediction system 110 may identify a predictive outcome pertaining to the predictive option selected by the user and/or a predictive outcome(s) pertaining to the set of predictive options presented to the user. Based on the identified predictive outcome(s), content prediction system 110 may assign a predictive score to the user. As previously described, the predictive score may correspond to the success or the failure of the user's prediction(s). For example, the predictive score may include an aggregated score pertaining to this baseball game, an aggregated score pertaining to the entire baseball season, an aggregated score pertaining to a particular baseball player, an aggregated score pertaining to a particular baseball team, for the game, for the entire season, etc., a score for this particular predictive outcome, etc.

According to an exemplary embodiment, content prediction system 110 may assign a score based on scoring rules. The scoring rules may assign values corresponding to the success or the failure of a predictive option selected by the user. According to an exemplary embodiment, the scoring rules may include an assignment of weights for calculating a score. For example, when the score includes an assignment of points versus, for example, percentages and/or other indicators of success, failure, etc., the number of points awarded (or deducted) may be based on factors, such as, when relative to the outcome of an event, did the user make his/her prediction. For example, if the user predicts the outcome of the baseball game (e.g., team A wins) in the first inning compared to the ninth inning (e.g., when team A is ahead by 9 runs), the user may be awarded a different number of points if team A should win the baseball game. According to such an example, content prediction system 110 may use probability analytics to account for the differences in possible success between the user selecting a predictive option that team A is to win when both teams have the same score in a first inning compared to when team A is ahead by 9 runs in the top of the ninth inning.

Additionally, or alternatively, according to an exemplary embodiment, the level of specificity of the predictive options selected by the user may impact the number of points awarded (or deducted). For example, if the user successfully predicts that the baseball player will get a hit versus hitting a triple, content prediction system 110 may award a different number of points.

Figure 1F:
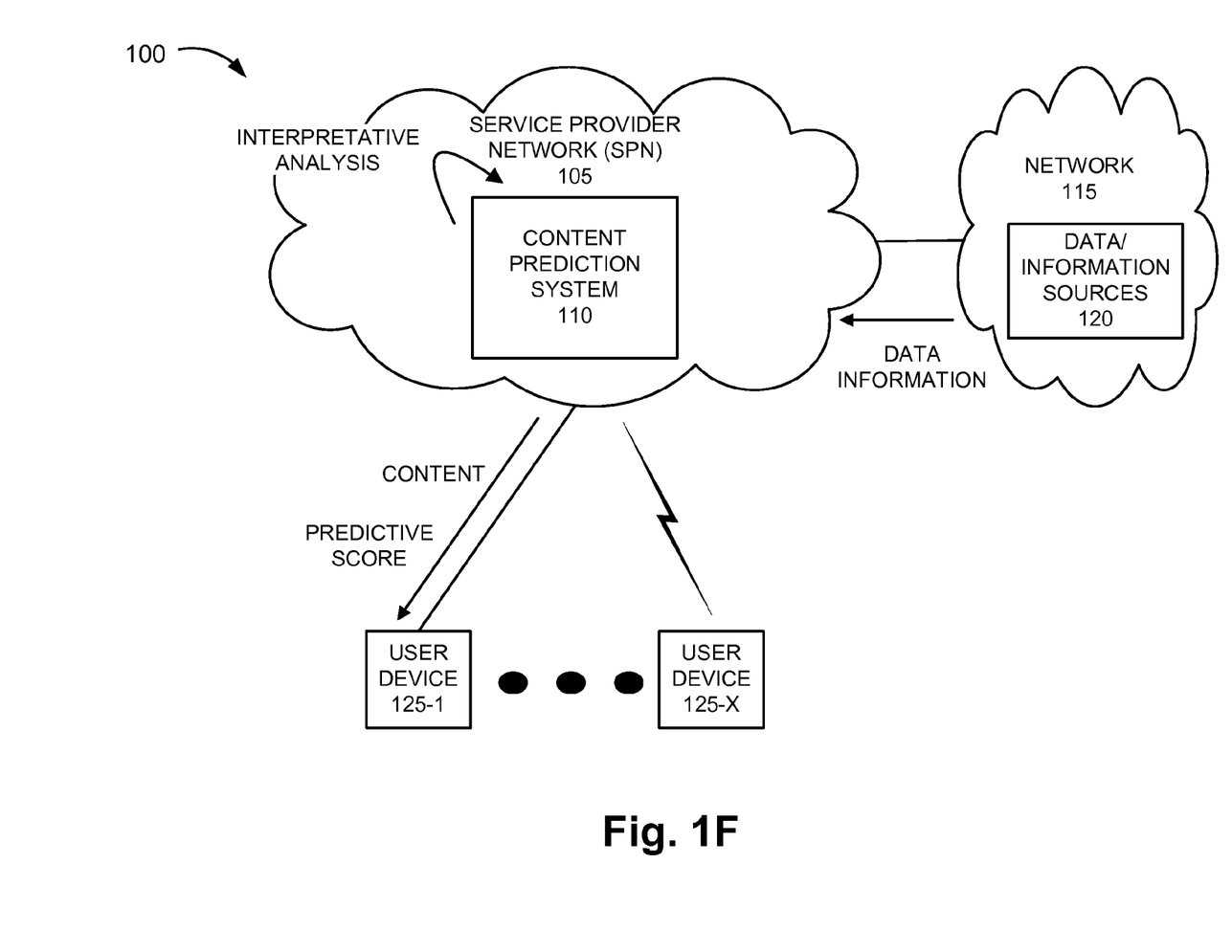
Figure 1G:
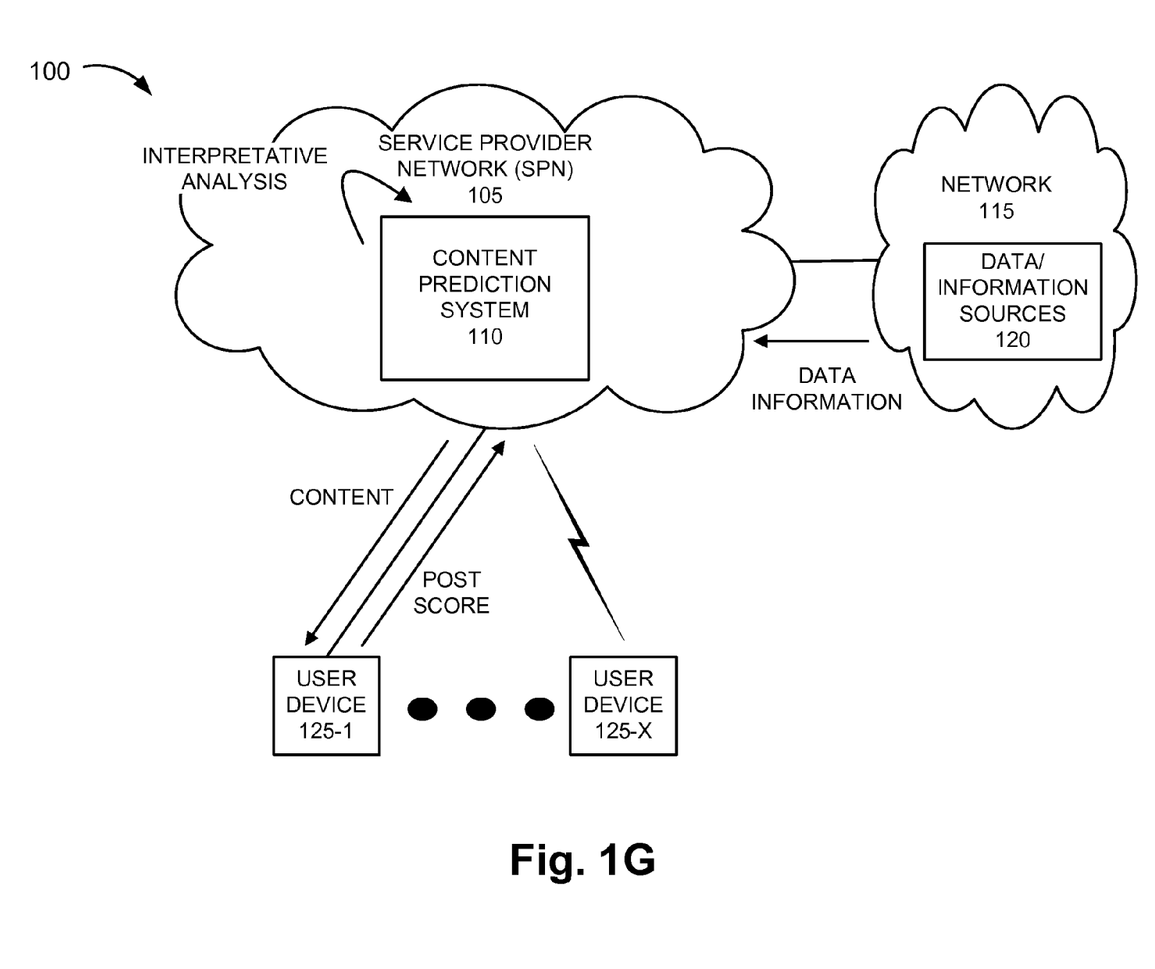

As illustrated in FIG. 1F, after content prediction system 110 assigns a score, the score may be sent to user via user device 125-1. In this example, the score may include an aggregated point score and a percentage of success for this baseball game. Referring to FIG. 1G, the user may view the score and percentage of success and post his/her score on a social network site (e.g., Facebook, etc.), share it with other users, etc.

Figure 2:
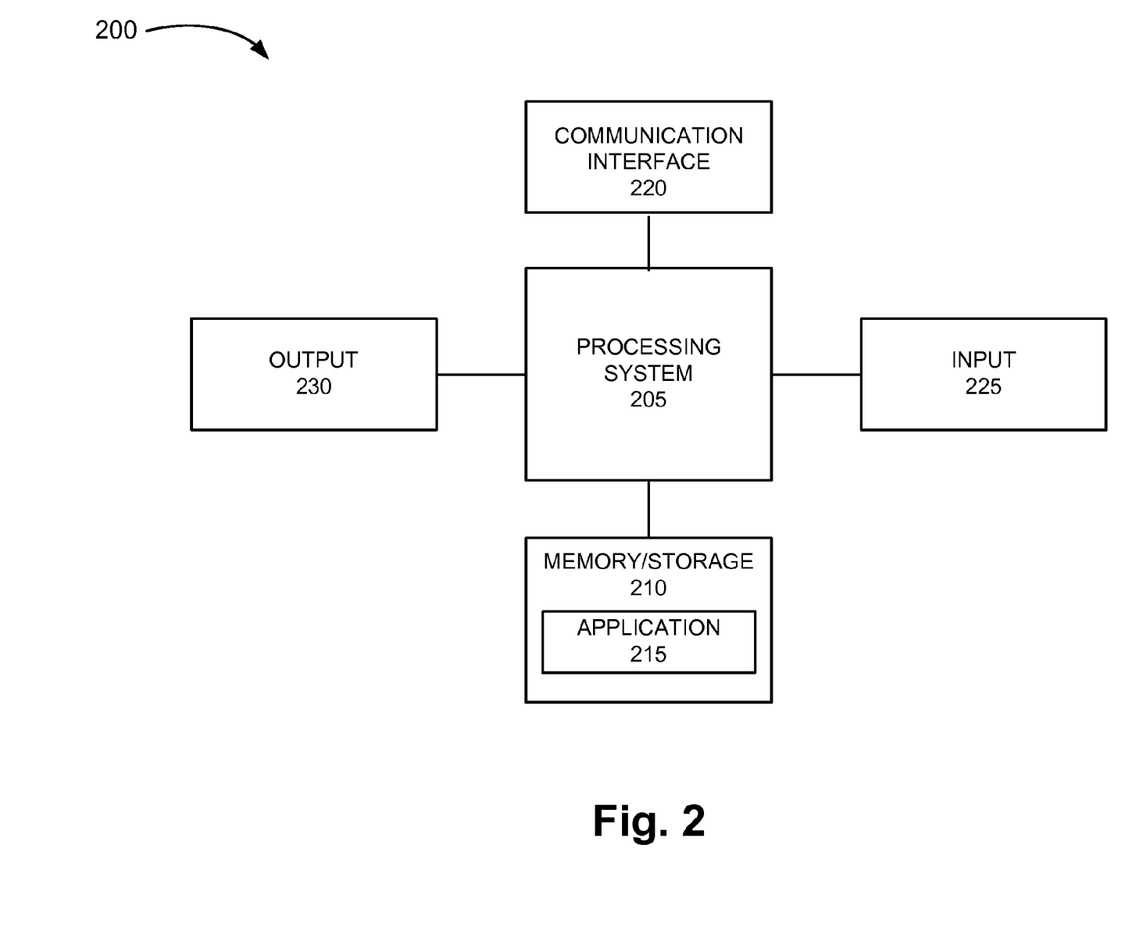
FIG. 2 is a diagram illustrating exemplary components of a device that may correspond to one or more of the devices in the environment depicted in FIGS. 1A-1G.

FIG. 2 is a diagram illustrating exemplary components of a device 200 that may correspond to one or more of the devices in environment 100. For example, device 200 may correspond to devices in SPN 105 (e.g., content prediction system 110), devices in network 115 (e.g., data/information sources 120), and user devices 125. As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple other types of storage devices. For example, memory/storage 210 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 210 may include a hard disk (e.g., a magnetic disk, an optical disk, a magneto-optic disk, a solid state disk, etc.) or some other type of storing medium, along with a corresponding drive. Memory/storage 210 may be external to and/or removable from device 200, such as, for example, a Universal Serial Bus (USB) memory, a dongle, a hard disk, mass storage, off-line storage, etc.

The term "computer-readable medium," as used herein, is intended to be broadly interpreted to include, for example, a memory, a storage medium, a CD, a DVD, a Blu-ray disc, or another type of tangible storing medium. Memory/storage 210 may store data, application(s), and/or instructions related to the operation of device 200.

Application 215 may include software that provides various services and/or functions. For example, with reference to content prediction system 110 and according to an exemplary embodiment, application 215 may include one or multiple applications for performing interpretative analysis, generating predictive options, identifying predictive outcomes, assign scores, etc.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

As described herein, device 200 may perform processes in response to processing system 205 executing software instructions (e.g., application 215) stored by memory/storage 210. By way of example, the software instructions may be read into memory/storage 210 from another memory/storage 210 or from another device via communication interface 220. The software instructions stored by memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

As previously described, content prediction system 110 may permit users to predict the outcome of events pertaining to content. For example, the content may pertain to entertainment, politics, news, sports, and/or other categories or genres of content. For example, reality television shows (e.g., talent search (e.g., Just Dance, etc.), docu-soaps (e.g., Jersey Shore, etc.), lifestyle change (e.g., Biggest Loser, etc.), dating (e.g., The Bachelorette, etc.), etc.), sporting events or tournaments (e.g., baseball, basketball, boxing, golf, hockey, football, the Olympics, soccer, billiards, poker, etc.), television series (e.g., Lost, Mad Men, Glee, etc.), award shows, such as, for example, music awards (e.g., Grammy Awards, MTV Video Music awards, American Music awards, etc.), motion picture or television-related awards (e.g., Emmy awards, Academy awards, People's Choice awards, Critics' Choice Movie awards, TV Land awards, etc.), etc.), court or court-related shows (e.g., Judge Judy, Judge Joe Brown, The People's Court, Nancy Grace, etc.), game shows (e.g., Deal or No Deal, Minute To Win It, Wheel of Fortune, The Price is Right, etc.), political commentaries or debates (e.g., Meet The Press, Chris Mathews, etc.), and/or news (e.g., local, national, etc., such as MSNBC, CNN, etc.).

Depending on the content, the data and/or information pertaining to the content may be different, and in turn, the predictive options. For example, with reference to reality television shows or television series, the predictive options may be character-specific, episode-specific, event-specific (e.g., what will happen next, who will be kicked off this week, etc.), etc. For example, with reference to sporting events or tournaments, the predictive options may be team-specific, player-specific, play-specific, such as, will football team A win, will player A score X number of points, will the quarterback pass, etc., time period specific (e.g., innings, quarters, boxing rounds, holes, season, playoffs, etc.), as well as other predictive options pertaining to a sport, tournament, athletic competition, etc. For example, with reference to award shows, the predictive options may be actor/actress-specific, music-group specific, song-specific, movie-specific, award-specific, as well as other predictive options pertaining to award shows. For example, with reference to court or court-related shows, the predictive options may be party-specific (e.g. plaintiff, defendant), ruling-specific (e.g., verdict-specific (e.g., judgment for plaintiff, etc.), count specific (e.g., count I, count II, etc.), testimony-specific, etc.). For example, with reference to game shows, the predictive options may be contestant-specific, episode-specific, game-event specific, etc.

For example, with reference to political commentary or debate, the predictive options may be host or guest-specific and/or other predictive options pertaining to the winner of the debate or commentary set forth. For example, with reference to news, the predictive options may be action-specific (e.g., what someone will say or do) or other particularities pertaining to the unfolding of intermediary circumstances, the outcome or finality of circumstances, etc.

According to an exemplary embodiment, users may login to content prediction system 110 so that successes and/or failures pertaining to predictions may be tracked to an individual. As an example, user devices 125 may include an application that provides a GUI for users to login. The GUI may also permit users to interact with content prediction system 110.

Figure 3:
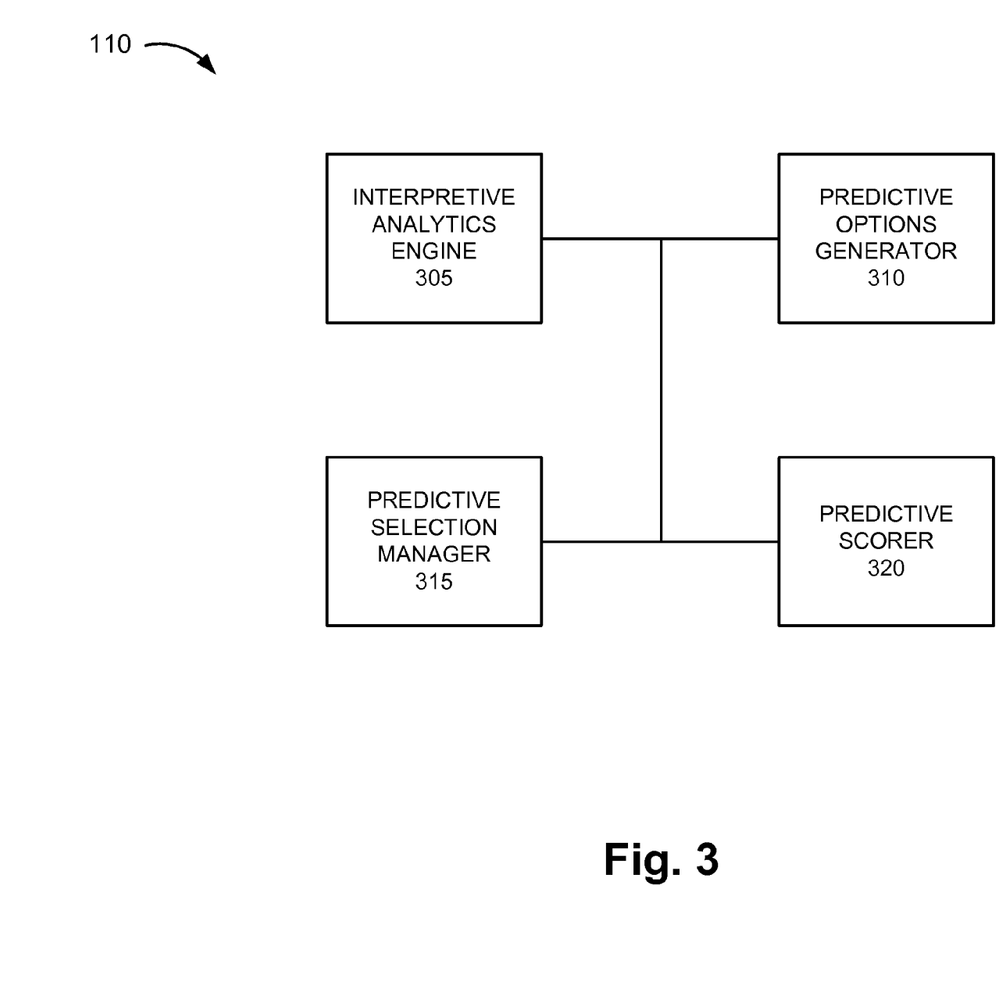
FIG. 3 is a diagram illustrating exemplary components or logic of an exemplary embodiment of a content prediction system.

FIG. 3 is a diagram illustrating exemplary components or logic of an exemplary embodiment of content prediction system 110. As illustrated, content prediction system 110 may include an interpretive analytics engine 305, a predictive options generator 310, a predictive selection manager 315, and a predictive scorer 320.

Interpretive analytics engine 305 may interpret data and/or information pertaining to content. According to an exemplary embodiment, interpretive analytics engine 305 may include a quantitative data and/or informational analyzer. For example, with reference to data and/or information pertaining to sports content, numerical data and/or information may be included. Interpretive analytics engine 305 may interpret data and/or information pertaining to the sports content based on the quantitative analyzer. Additionally, according to an exemplary embodiment, content prediction system 110 may include a qualitative data and/or informational analyzer. The qualitative analyzer may interpret words and other forms of text.

At least in some cases, the data and/or information received from data/information sources 120 may be in a particular data format, metadata format, and/or informational format. For example, certain fields of data and/or information may be known to represent particular information according to the structure of the format. Content prediction system 110 may use this knowledge to assist in interpreting the data and/or information received.

According to an exemplary embodiment, interpretive analytics engine 305 may use closed-captioning for the hearing impaired data to interpret what is happening, what is being said, etc., during the content. For example, interpretive analytics engine 305 may include an artificial intelligence (AI) component or logic to understand the content in real-time or near-real time.

Predictive options generator 310 may generate a set of predictive options pertaining to content. For example, predictive options generator 310 may generate sentences, phrases, or one or more words that correspond to or represent a predictive option. According to an exemplary embodiment, predictive options generator 310 may generate predictive options based on interpretive data and/or information output from interpretive analytics engine 305. According to another exemplary embodiment, predictive options generator 310 may generate predictive options based on a program format pertaining to the content. For example, it is common for game shows, talk shows, court shows, etc., to have a predictable program format. For example, a portion of the content is dedicated to introducing the players, the guests, the plaintiff and the defendant, etc., another portion of the content is for playing the game, discussion, hearing the case, etc. Based on the program format, predictive options generator 310 may generate a set of predictive options pertaining to the content.

Predictive selection manager 315 may identify predictive outcomes pertaining to the predictive options selected by users. For example, predictive selection manager 315 may compare data and/or information, which may be interpreted by interpretive analytics engine 305, with the selected predictive options, to determine whether the predictive outcomes and the selected predictive options match. Predictive selection manager 315 may identify the success or the failure of the users' prediction based on the comparison.

Predictive scorer 320 may assign scores and/or other identifiers indicative of the successes or the failures of the users. As previously described, according to an exemplary embodiment, predictive scorer 320 may assign scores based on weights. For example, the value of the weights may be based on when the users make his/her selection of the prediction selection relative to the event, the level of specificity of the predictive option, and/or other probabilistic-related factors. According to other exemplary embodiments, the scores may not be based on weights. For example, the scores may be a fixed number of points (e.g., correct prediction or incorrect prediction).

Although FIG. 3 illustrates exemplary components or logic of an exemplary embodiment of content prediction system 110, according to other exemplary embodiments, content prediction system 110 may include additional components or logic, fewer components or logic, and/or different components or logic. For example, content prediction system 110 may include a data mining engine to collect data and/or information pertaining to content and/or subject matter being discussed, covered, and/or related to the content. The data mining engine may provide the data and/or information to interpretive analytics engine 305.

Figure 4:
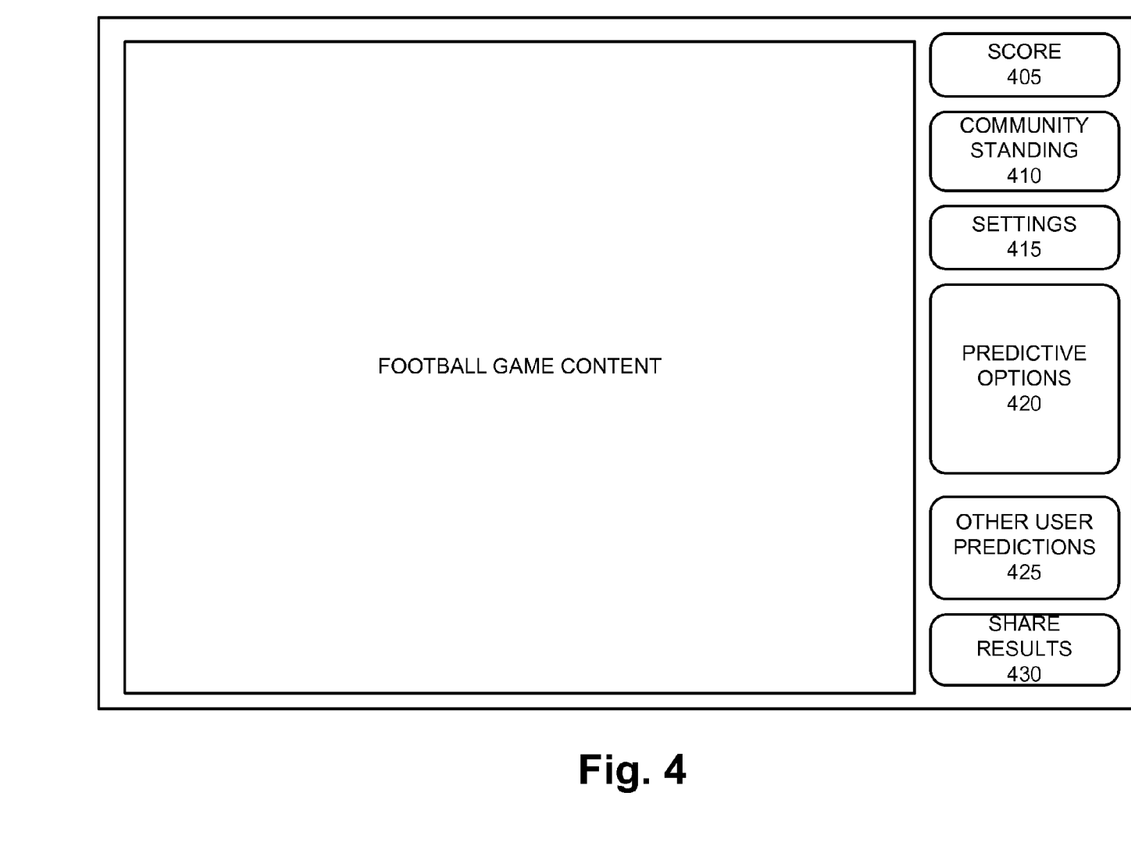
FIG. 4 is a diagram illustrating an exemplary graphical user interface pertaining to a content prediction system.

FIG. 4 is a diagram illustrating an exemplary graphical user interface pertaining to content prediction system 110. According to other embodiments, the graphical user interface may include additional, fewer, and/or different interfaces. As illustrated, the graphical user interface may include a score 405, a community standing 410, a settings 415, predictive options 420, other user predictions 425, and share results 430.

Score 405 may provide information pertaining to a user's score. For example, as previously described, the score may correspond to a point system and/or other indicators pertaining to the success and/or failure of predictions (e.g., percentages, etc.). Community standing 410 may include a ranking of the user relative to other users. For example, the ranking may indicate the user's rank for predictions made pertaining to the football game content, sports content in general, all content, etc.

Settings 415 may permit the user to configure preferences pertaining to the graphical user interface and/or content prediction system 110. For example, with reference to preferences pertaining to the graphical user interface, the user may select what menus, icons, etc., are visible or hidden, themes or skins (e.g., football theme or skin (e.g., a Dallas Cowboys theme or skin, etc.), a court show theme or skin (e.g., a Judge Judy theme, etc.), etc.) for the graphical user interface, etc. Additionally, for example, with reference to preferences pertaining to content prediction system 110, the user may select the specificity of predictive options (e.g., high, medium, low, fine, coarse, etc.), the target of predictive options (e.g., a person, overall outcome, play in sport, etc.), defaults for sharing results, participation in user communities, etc.

Predictive options 420 may display to the user predictive options. For example, with reference to the football game, the predictive options may include predictive options for both the offense and the defense. For example, predictive options for the defensive team pertaining to a next play may include (1) interception; (2) quarterback sack; (3) fumble; (4) field goal block; and (5) flag; and predictive options for the offensive team pertaining to the next play may include (1) pass; (2) run; (3) touchdown; (4) field goal; and (5) flag. According to an exemplary embodiment, each predictive option may indicate the number of points that will be awarded to the user, if the user selects a particular predictive option and is correct. For example, (1) interception (10 points); touchdown (20 points), etc. According to an exemplary embodiment, points may be awarded based on how close the predictive option is to the actual outcome. For example, if the user predicts a 6-yard run and the actual play results in a 5-yard run, the user may be awarded a certain number of points for being very close to the actual outcome.

Other user predictions 425 may display other users' predictions. According to an exemplary embodiment, the user may be able to filter or select the other users' the user is interested in via settings 415. For example, the user may be interested in what his/her friend selects for the upcoming set of prediction options.

Share results 430 may permit the user to share his/her scores with other users and/or non-users. For example, the user may share his/her scores on social networking sites (e.g., Facebook, Twitter, etc) and/or have his/her scores posted on a local or national community prediction board.

Figure 5A:
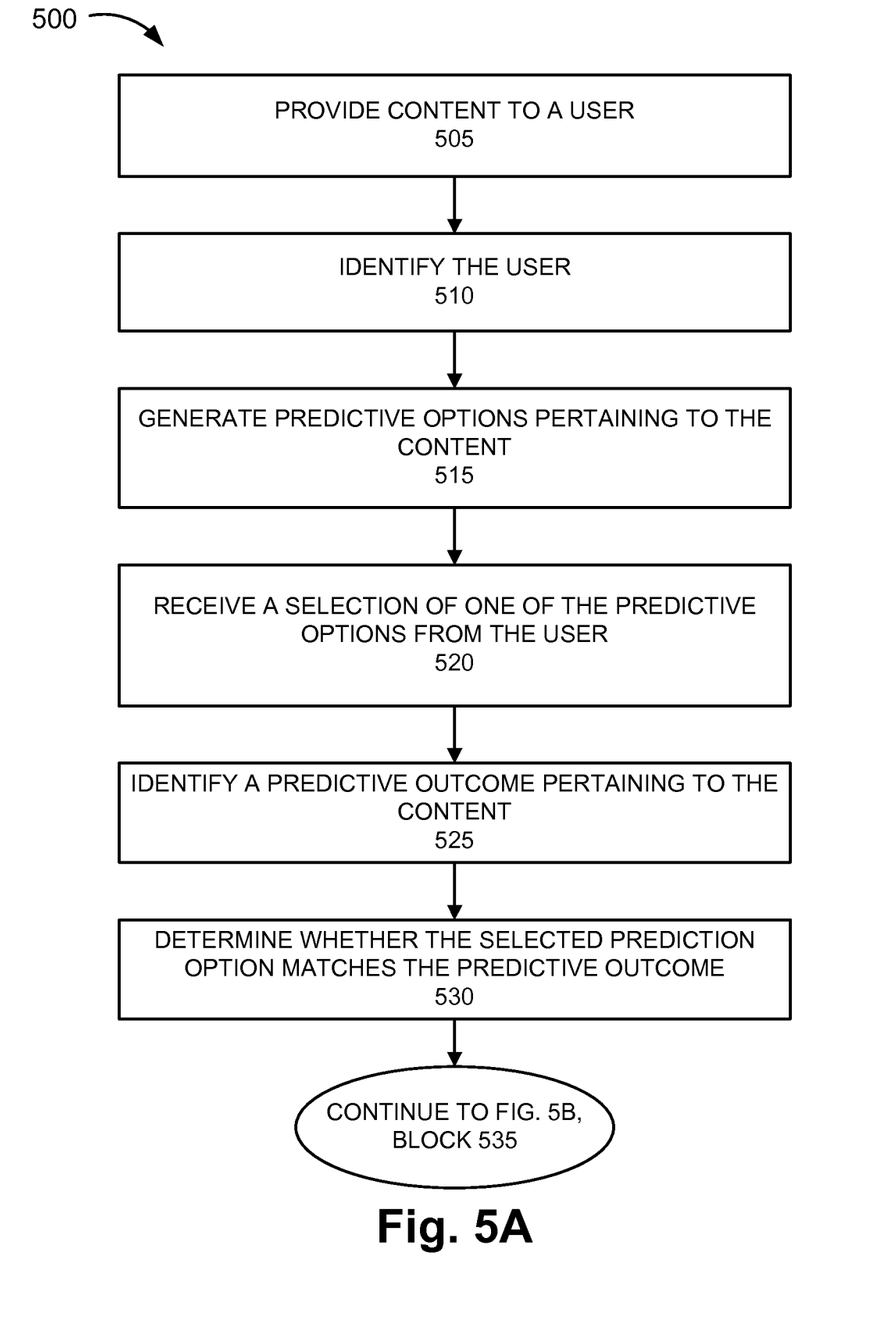
FIGS. 5A and 5B are flow diagrams illustrating an exemplary process associated with an exemplary embodiment of content prediction system for providing interactive, user-prediction of content.
Figure 5B:
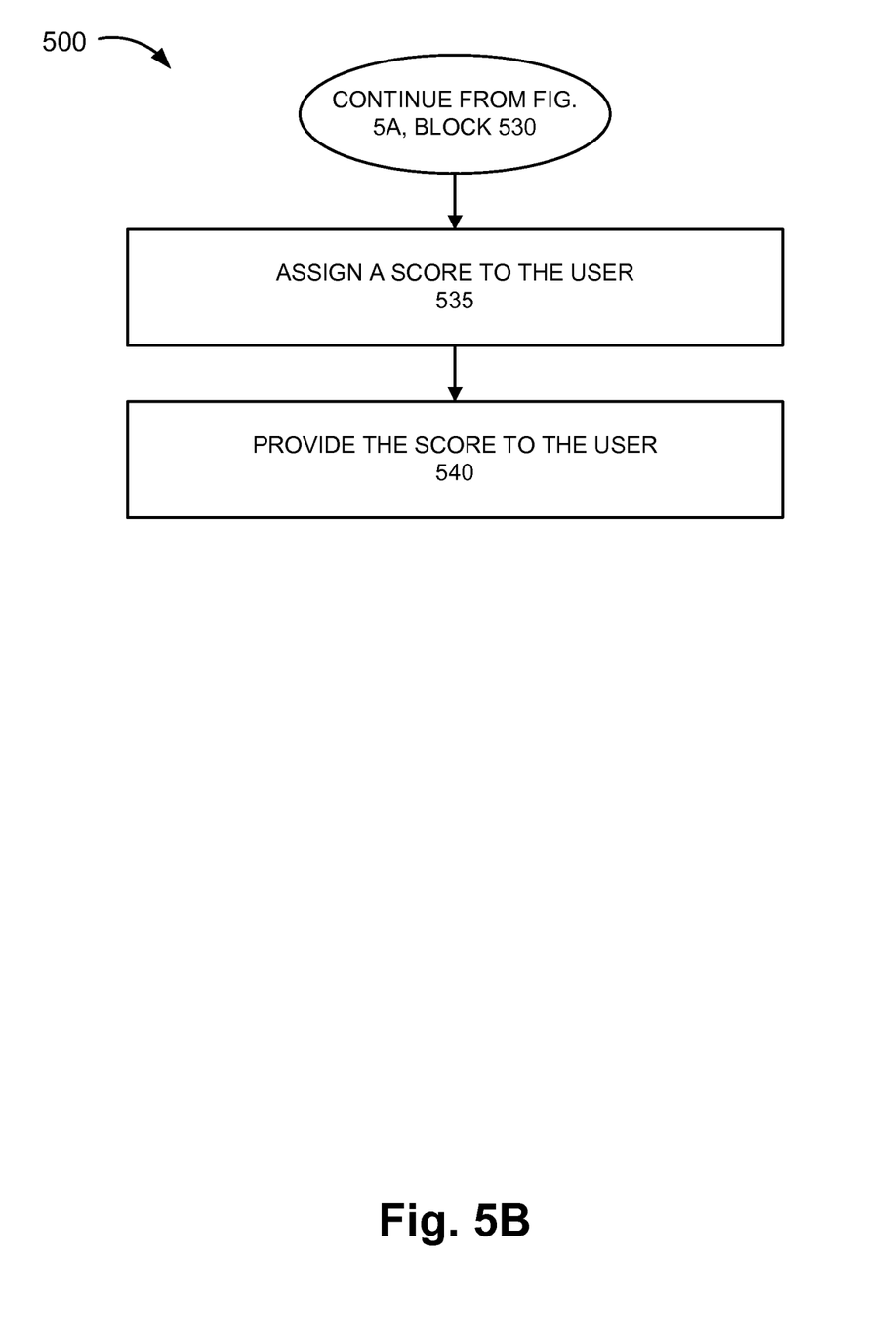

FIGS. 5A and 5B are flow diagrams illustrating an exemplary process associated with an exemplary embodiment of content prediction system 110 for providing interactive, user-prediction of content.

Process 500 may include providing content to a user (block 505). For example, as previously described, a service provider network 105 may provide content to users. For example, the content may include television content and Internet content.

The user may be identified (block 510). For example, as previously described, the user may manually identify himself/herself (e.g., based on a log-in) or may be automatically identified based on device identifiers (e.g., telephone number, network address (e.g., Internet Protocol address, a Media Access Control address, etc.), customer equipment identifier, a set top box identifier, a mobile device identifier, etc.).

Predictive options pertaining to the content may be generated (block 515). For example, as previously described, interpretive analytics engine 305 may receive data, information, and/or content from data/information sources 120. Interpretive analytics engine 305 may use a quantitative data and/or informational analyzer, a qualitative data and/or informational analyzer, and/or an AI component or logic to interpret data and/or information pertaining to the content and/or to interpret the content. Predictive options generator 310 may generate predictive options based on interpretive data and/or information received from interpretive analytics engine 305.

A selection of one of the predictive options may be received (block 520). For example, as previously described, the user may select a predictive option from a set of predictive options generated by predictive options generator 310.

A predictive outcome pertaining to the content may be identified (block 525). For example, as previously described, predictive selection manager 315 may compare data and/or information, which may be interpreted by interpretive analytics engine 305, with the selected predictive options.

It may be determined whether the selected prediction option matches the predictive outcome (block 530). For example, as previously described, predictive selection manager 315 may determine whether the selected predictive option corresponds to the identified predictive outcome. For example, predictive selection manager 315 may compare data and/or information, which may be interpreted by interpretive analytics engine 305, with the selected predictive options, to determine whether the predictive outcomes and the selected predictive options match.

A score may be assigned to the user (block 535). For example, as previously described, predictive scorer 320 may assign a score to the user based on the success or failure of his/her selected predictive option. The score may include a point system and/or other indicators of success or failure (e.g., percentages, etc.).

The score may be provided to the user (block 540). For example, as previously described, content prediction system 110 may provide the score to the user via user device 125. The user may have the option to post his/her score to social networking sites (e.g., Facebook, Twitter, etc.), local or national prediction boards, web sites, etc.

Although FIGS. 5A and 5B illustrate an exemplary process 500 for providing interactive user-prediction of content, process 500 may include additional operations, fewer operations, and/or different operations than those illustrated in FIGS. 5A and 5B and described herein. Additionally, while process 500 is described with reference to exemplary components or logic of an exemplary embodiment of content prediction system 110, according to other embodiments, block(s) described in process 500 may be performed by a device or a component or combination of devices or components other than those specifically mentioned.

The foregoing description of embodiments provides illustration, but is not intended to be exhaustive or to limit the embodiments to the precise form disclosed. Accordingly, modifications to the embodiments described herein may be possible. For example, content prediction system 110 may present to users trivia questions pertaining to the content. Users that correctly answer the trivia questions may be awarded bonus points or other positive indicators. As an example, with respect to the airing of a Super Bowl game, content prediction system 110 may present questions related to previous Super Bowls (e.g., teams played, particular players, etc.).

According to an exemplary embodiment, a user may view a sporting event (e.g., a baseball game, a football game, etc.) on-line based on text-only. For example, with reference to a baseball game, some web sites provide pitch-by-pitch and play-by-play data. Under such circumstances, content prediction system 110 may be used to allow the user to select predictive options and receive scores.

According to an exemplary embodiment, the content may correspond to a first-airing or live broadcast. According to other embodiments, the content may not be a first-airing or live broadcast.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processing system 205, etc.), a combination of hardware and software (e.g., application 215), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction described in the present application should be construed as critical or essential to the embodiments described herein unless explicitly described as such.

What is claimed is:

1. A method comprising:
   providing at least one of a television service or an Internet access service to a user device associated with a customer;
   generating predictive options pertaining to content delivered via the at least one of the television service or the Internet access service, wherein the predictive options correspond to possible future events that could occur with respect to the content;
   determining multiple sets of the predictive options based on a different time granularity for each set of the predictive options, wherein the different time granularities are configured by the customer;
   providing, at particular points in the content and for presentation via a user interface of the user device, a different set of the predictive options that share a common time-granularity corresponding to a particular future event with respect to the content;
   receiving, from the user device, a customer selection of one of the presented predictive options;
   determining an amount of correspondence of the customer-selected predictive option to an actual outcome with respect to the content; and
   assigning a score to the customer based on the amount of correspondence of the customer-selected predictive option to the actual outcome.

2. The method of claim 1, further comprising:
   receiving at least one of data or information pertaining to the content; and
   interpreting the at least one of data or information, and wherein the generating of the predictive options is based on the interpreted data or information.

3. The method of claim 2, further comprising:
   identifying the actual outcome based on the interpreted data or information.

4. The method of claim 1, wherein the content includes television content including sports content, entertainment content, court show content, and political show content.

5. The method of claim 1, further comprising:
   identifying the customer when the customer uses the user device to receive the at least one of the television service or the Internet access service.

6. The method of claim 1, further comprising:
   receiving a customer-selection to post the score to a social network site.

7. The method of claim 1, wherein when the content corresponds to sports content, the predictive options are directed to a player, a next play, or an outcome of a game.

8. The method of claim 1, wherein the generating comprises performing at least one of quantitative data analysis or qualitative data analysis of data or information pertaining to the content.

9. A device comprising:
   a memory storing instructions; and
   one or more processors to execute the instructions to:
   generate predictive options pertaining to television content delivered to a user device associated with a customer, wherein the predictive options correspond to events that could occur with respect to the television content;
   determine multiple sets of the predictive options based on a different time granularity for each set of the predictive options, wherein the different time granularities are configured by the customer;
   provide, at particular points in the television content and for presentation via a user interface of the user device, a different set of the predictive options that share a common time-granularity corresponding to a particular future event with respect to the television content;
   receive, from the user device, a customer selection of one of the presented predictive options;
   determine an amount of correspondence of the customer-selected predictive option to an actual outcome with respect to the television content; and
   assign a score to the customer based on the amount of correspondence of the customer-selected predictive option to the actual outcome.

10. The device of claim 9, wherein when generating the predictive options, the one or more processors are further configured to:
    receive from a data or information source at least one of data or information characterizing the television content; and
    interpret the at least one of data or information.

11. The device of claim 10, wherein the data includes closed captioning for the hearing impaired data.

12. The device of claim 9, wherein when determining, the one or more processors are further configured to:
   identify the actual outcome; and
   compare the customer-selected predictive option to the identified outcome.

13. The device of claim 9, wherein the television content pertains to entertainment, politics, sports, news, or a television series.

14. The device of claim 9, wherein the television content is a football game, and the predictive options are player-specific, team-specific, or play-specific.

15. The device of claim 9, wherein the one or more processors comprise:
   a quantitative data analyzer; and
   a qualitative data analyzer.

16. A non-transitory computer-readable medium comprising executable instructions for execution by at least one processing system, the instructions causing the at least one processing system to:
   generate predictive options pertaining to content delivered to a user device associated with a customer, wherein the predictive options correspond to events that could occur with respect to the content;
   determine multiple sets of the predictive options based on a different time granularity associated with each set of the predictive options;
   provide, at particular points in the content and for presentation via a user interface of the user device, a different set of the predictive options that share a common time-granularity corresponding to a particular point in the content, wherein the common time-granularity is user-configurable;
   receive, from the user device, a customer selection of one of the presented predictive options;
   determine an amount of correspondence of the customer-selected predictive option to an actual outcome associated with the content; and
   provide a result for display to the customer based on the amount of correspondence of the customer-selected predictive option to the actual outcome.

17. The non-transitory computer-readable medium of claim 16, wherein the instructions further cause the at least one processing system to:
   interpret closed captioning for the hearing impaired data, and wherein the generating is based on the interpreted closed captioning for the hearing impaired data.

18. The non-transitory computer-readable medium of claim 16, wherein the content includes television content.

19. The non-transitory computer-readable medium of claim 18, wherein the television content is a live broadcast of a sporting event.

20. The non-transitory computer-readable medium of claim 16, the instructions further causing the at least one processing system to:
   receive a selection, by the customer, to post the result to a social network site.

* * * * *